United States Patent [19]
Dawkins

[11] 3,885,398
[45] May 27, 1975

[54] AIR CONDITIONING SYSTEM FOR A MOTOR HOME VEHICLE OR THE LIKE

[76] Inventor: Claude W. Dawkins, 4900 N.W. 30 St., Oklahoma City, Okla. 73122

[22] Filed: Dec. 10, 1973

[21] Appl. No.: 423,280

[52] U.S. Cl. .................. 62/89; 62/510; 62/259; 62/236; 62/243; 62/244; 62/228; 62/229
[51] Int. Cl. .................................... F25d 17/06
[58] Field of Search .......... 62/259, 236, 243, 244, 62/239, 228, 229, 89

[56] References Cited
UNITED STATES PATENTS

| | | | |
|---|---|---|---|
| 2,054,350 | 9/1936 | Weiland | 62/244 |
| 2,513,679 | 7/1950 | Ritter | 62/239 |
| 2,784,568 | 3/1957 | Schjolin | 62/239 |
| 2,869,333 | 1/1959 | Hoiby | 62/259 |
| 2,907,182 | 10/1959 | Kuklinski | 62/236 |
| 3,218,821 | 11/1965 | Spatt | 62/244 |
| 3,315,488 | 4/1967 | Lind | 62/259 |
| 3,347,310 | 10/1967 | Lind | 62/259 |
| 3,719,058 | 3/1973 | Waygood | 62/243 |

Primary Examiner—William J. Wye
Attorney, Agent, or Firm—Dunlap & Codding

[57] ABSTRACT

A method and assembly for air conditioning a motor home vehicle or the like employing a heat transfer medium and cooling both the front passenger area and the rear living area using a single compressor source. The assembly having a compressor driven either by the vehicle's engine or a compressor driven by an electric drive motor, a first and second condenser mounted on the roof of the vehicle, a first and second evaporator mounted to a first and second blower, the first evaporator and first blower mounted under the dash of the vehicle and the second evaporator and second blower mounted on the roof of the vehicle.

11 Claims, 4 Drawing Figures

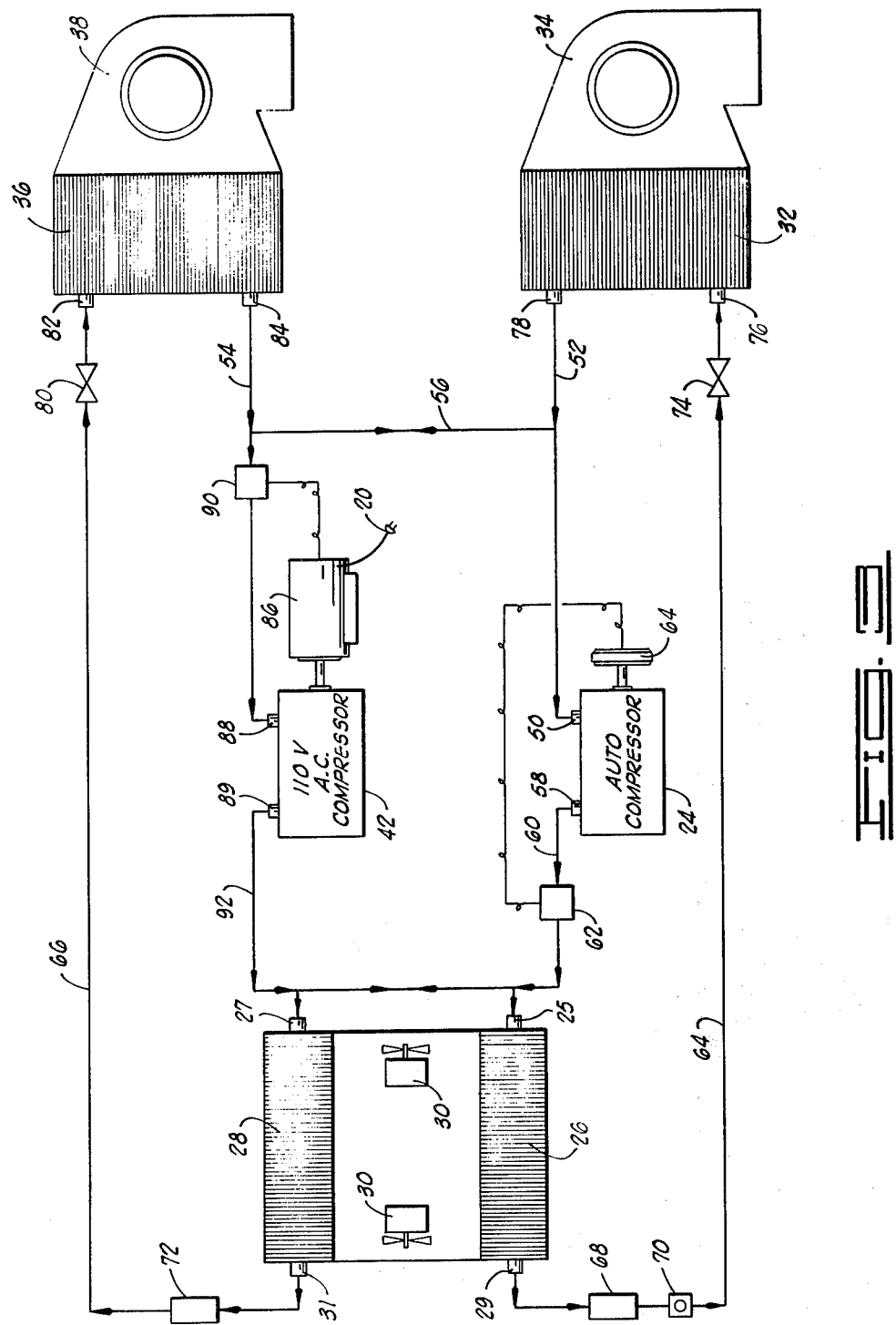

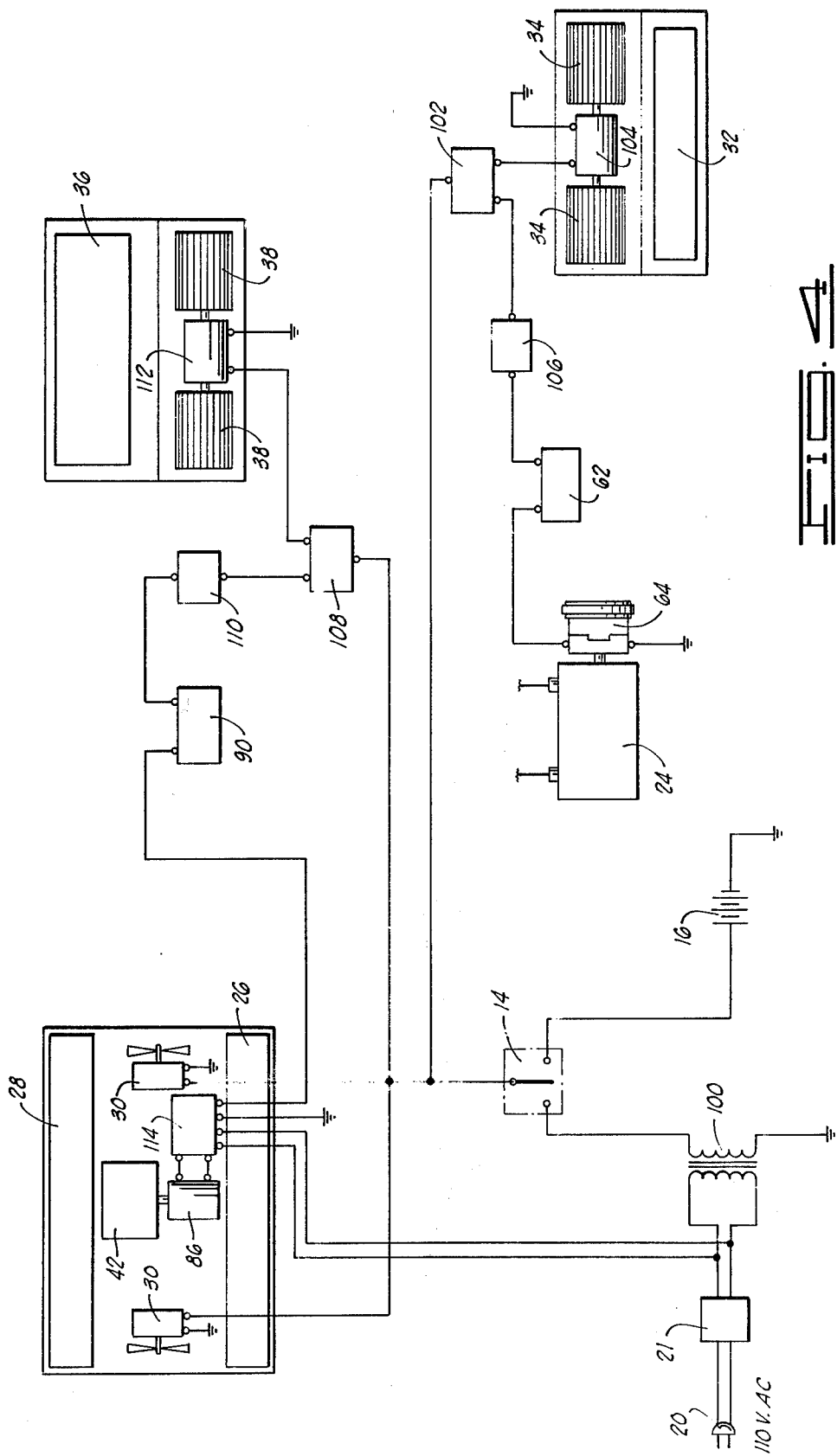

AIR CONDITIONING SYSTEM FOR A MOTOR HOME VEHICLE OR THE LIKE

BACKGROUND OF THE INVENTION

1. Field of the Invention

This invention relates generally to an assembly and method for air conditioning a motor home vehicle or the like and more particularly but not by way of limitation to the cooling of both the front passenger area and the rear living area using a single compressor source and without the use of an automotive condenser used in conjunction with the vehicle's radiator system.

2. Description of the Prior Art

Various methods and assemblies have been developed to air condition motor home vehicles or the like. There are two principal refrigeration type air conditioning systems currently employed in such vehicles. The first is an air conditioning system in which the compressor is driven by the vehicle's engine. The second is a separate system which is operable when the vehicle is parked and employs an electric motor-driven compressor, powered by an electric circuit supplied by an auxiliary gas generator or by an outside a-c line voltage source.

These two principal systems are not without problems. The air conditioning unit driven off the vehicle engine is normally sufficient to cool the front passenger area but is not large enough or does not have the capacity to cool the rear living area. Therefore, when the motor home is being driven, the rear living area is not cooled sufficiently. Also because of the size and weight of the motor home vehicle and the large engine horse power required to drive the vehicle, the radiator system coupled with a conventional automotive condenser is often not sufficient to prevent the engine from overheating.

Also when the vehicle is parked, the separate electric motor-driven compressor system driven by an a-c line voltage source is designed to cool the rear living area and is not sufficient to cool the front passenger area. If there is no a-c line voltage available, the rear living area is not cooled.

The present invention anticipates and eliminates the above problems by installing two over-sized condensers on the roof of the vehicle so that the heat transfer medium being compressed by the engine driven compressor can be condensed by the over-sized condensers on top of the roof and conducted to the evaporators installed under the dash of the front passenger area and installed in the rear living area, thus cooling both areas sufficiently without overloading or overheating the vehicle engine. Because of the separate over-sized condensers more efficient heat transfer mediums can be used and more particularly but not by way of limitation refrigerants such as Freon 22 can be used which heretofore could not be used efficiently in automotive air conditioning applications. It should be mentioned that the term over-sized is used in reference to automotive condensers which normally have two rows of condenser coils while the oversized condensers have four rows of condenser coils. By going to oversize condensers an over-condensing effect is created which keeps excessive head pressure down when using refrigerants such as Freon 22 which has a lower boiling point than standard refrigerants used with automotive equipment.

Also, if for some reason the engine driven compressor cannot be used and an auxiliary a-c line voltage gas generator is provided for on the vehicle, both the front passenger and rear living area can be cooled while the vehicle is being driven.

If there is no alternating current line voltage available when the vehicle is parked, the vehicle engine can be started and idled so that the rear living area can be air conditioned.

A further problem with separate air conditioning systems driven by an auxiliary gas generator or by an outside a-c line voltage source is that the a-c motor-driven compressor, condenser and evaporator are mounted together as a unit and normally positioned over a fresh air opening in the roof of the motor home. This requires extra roof reinforcement around the fresh air opening, the overall height is a disadvantage because the compressor is not recessed in the roof, and the compressor and condenser blowers cause excessive noise to the people in the rear living area.

By the present invention, the condenser and compressor are separate from the evaporators. The roof-mounted a-c motor-driven compressor and the heavy duty condensers are installed over a closet with the compressor being recessed in the closet with the advantage of the noise being suppressed in the closet. No additional reinforcement is required in the roof due to the reinforcement construction of the closet structure and the air conditioning plumbing can be hidden in the closet. By recessing the compressor in the closet the minimum overall height of the vehicle can be maintained.

SUMMARY OF THE INVENTION

The present invention relates to an assembly and method for air conditioning motor home vehicles employing a heat transfer medium for cooling both the front passenger area and the rear living area. The assembly being distinguished by having a toggle switch which electrically switches the system operated from a twelve volt battery source with a compressor driven by the vehicle's engine to an a-c line voltage source driving a 110 volt electric motor driven compressor. The assembly having over-sized condensers mounted on the roof of the vehicle for receiving the compressed heat transfer medium from either the engine driven compressor or the a-c electric motor driven compressor and supplying an evaporator mounted under the dash of the vehicle and an evaporator mounted on the roof of the vehicle.

It is therefore a general object of the present invention to provide an assembly that will simultaneously cool both the front passenger area and the rear living area without using separate air conditioning systems.

A further object of the present invention is to provide a method for cooling both a front passenger area and a rear living area without using separate air conditioning systems.

A still further object of the present invention is to provide an air conditioning system in which the air conditioning compressor can be driven either by the vehicle's engine or by an a-c electric motor-driven compressor.

Another object of the present invention is to eliminate the use of an automotive condenser used in conjunction with the vehicle's radiator.

Other objects and advantages of the invention will be evident from the following detailed description when read in conjunction with the accompanying drawings which illustrate the invention.

BRIEF DESCRIPTION OF THE DRAWINGS

FIG. 3 is a diagrammatic illustration of the air conditioning assembly.

FIG. 4 is an electrical wiring diagram of the air conditioning assembly.

DESCRIPTION OF THE PREFERRED EMBODIMENTS

Figure 1:
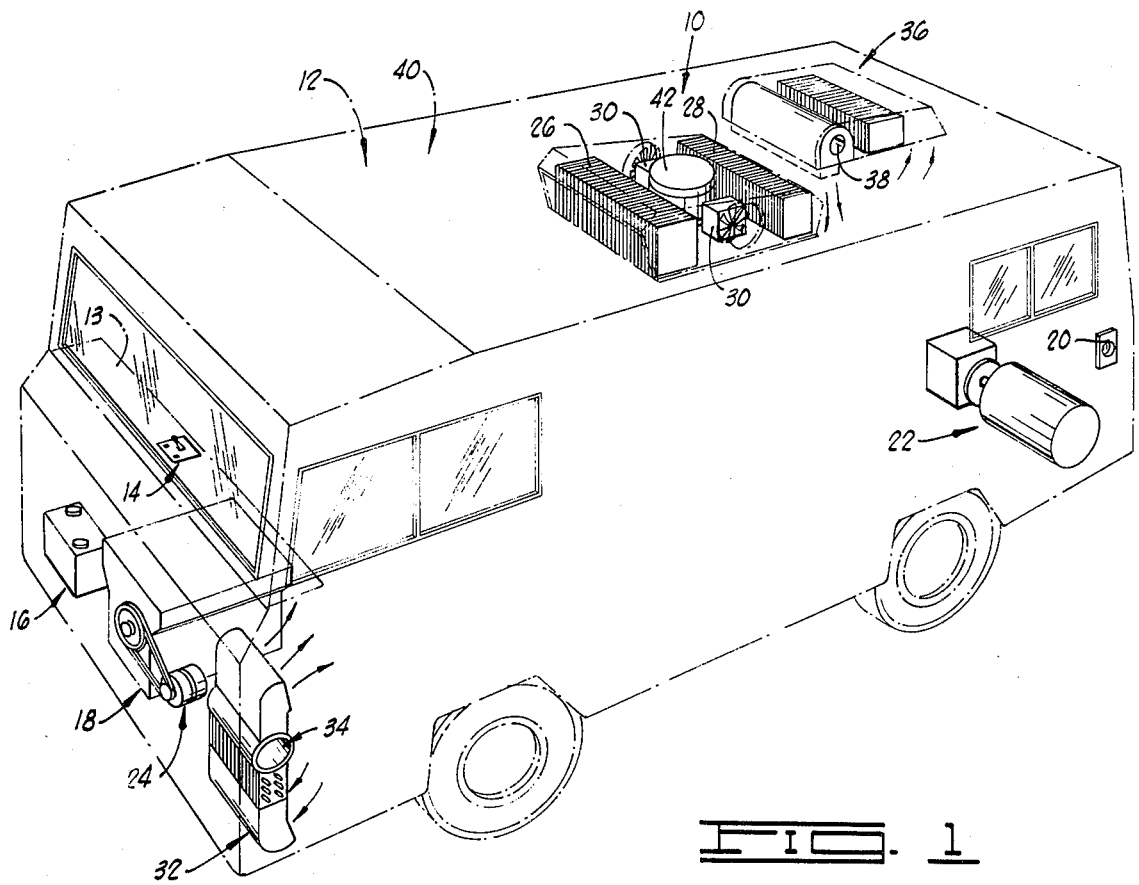
FIG. 1 is a perspective view of the air conditioning assembly mounted on a motor home vehicle.

Referring now to FIG. 1 of the drawings the air conditioning assembly is generally designated by the reference numeral 10 and is mounted on a motor home vehicle 12. FIG. 1 is shown to point out the various electrical and mechanical equipment in the assembly 10 and its preferred location on vehicle 12 but the drawing does not show the equipment electrically or mechanically connected.

Shown on the vehicle's dash 13 of the vehicle 12 is a toggle switch 14 for switching the system from a 12 volt battery source 16 mounted proximate to the vehicle's engine 18 to a 110 volt ac line voltage source provided either by connecting an electrical outlet 20 to an outside source or by connecting to a separately mounted gas driven generator 22. When the assembly 10 is driven by the 12 volt battery source 16 the engine 18 drives an automotive compressor 24 which compresses a fluid heat transfer medium which is conducted to roof mounted over-sized condensers 26 and 28. The over-sized condensers 26 and 28 having four rows of condenser coils for maximum condensing when using refrigerants having low boiling points. The condensers 26 and 28 have air circulating blowers 30. From the condensers 26 and 28 the heat transfer medium is conducted to an evaporator 32 ventedly connected by a suitable duct to a blower 34 mounted under the vehicle's dash 13 and an evaporator 36 ventedly connected by a suitable duct to a blower 38 mounted on the vehicle's roof 30. When the assembly 10 is connected to the 110 volt a-c source, an electric motor-driven compressor 42 compresses the heat transfer medium which is conducted through the condensers 26 and 28 and to the evaporators 32 and 36.

Figure 2:
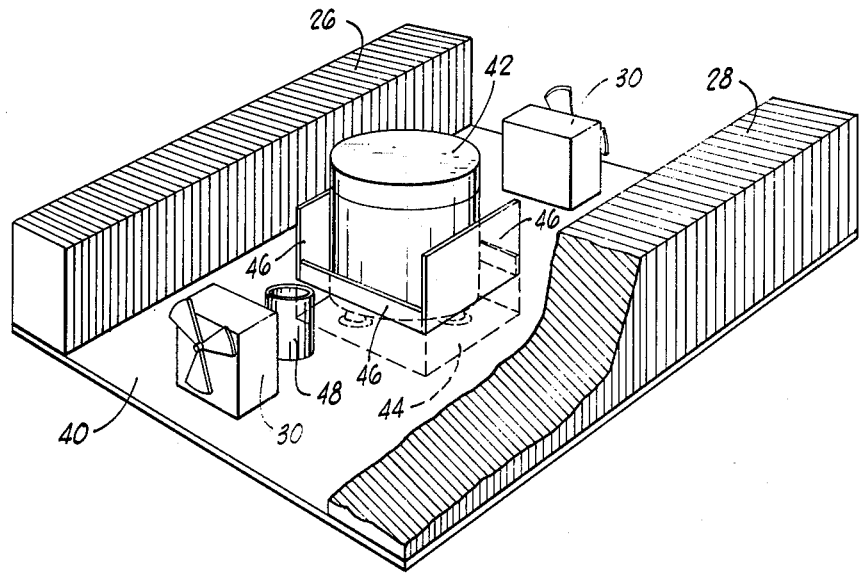
FIG. 2 is a perspective view of the roof mounted electric drive motor compressor and condensers.

FIG. 2 is a perspective view of the roof mounted condensers 26 and 28 with the electric motor driven compressor 42 recessed in the roof 40 to provide a minimum clearance as to the overall height of the vehicle 12. Shown around the recess 44 are water baffles 46 to prevent water from collecting or running into the bottom of the recess 44. Air circulating fans 30 are positioned adjacent to the condensers 26 and 28 to aid in drawing air through the condensers. A tubing conduit opening 48 is shown for receiving suction and discharge conduits to the condensers 26 and 28 and the compressor 42.

In FIG. 3 a conduit piping diagram is shown of the air conditioning assembly 10. When the engine driven compressor 24 is in use it receives gaseous heat transfer medium through suction port 50 from a first suction conduit means 52 and a second suction conduit means 54 via a third suction conduit means 56.

From compressor 24 the compressed gaseous heat transfer medium is conducted through discharge port 58 to a first discharge conduit means 60. Attached to the conduit means 60 is a high pressure cut out switch 62 (i.e., for pressures greater than 400 psi) which is responsive to the pressure of the heat transfer medium and is electrically connected to a clutch assembly 64 which engages and disengages the compressor 24 from the engine 18.

The heat transfer medium now passes into inlet port 25 of condenser 26 and inlet port 27 of condenser 28 where it is condensed and the liquid heat transfer medium is discharged through outlet ports 29 and 31 to a first liquid conduit means 64 and a second liquid conduit means 66. The first liquid conduit means 64 has a dryer 68 connected to it for absorbing moisture in the heat transfer medium and a sight glass 70 for determining if the asssembly 10 has any air circulating through the system. Also, the second liquid conduit means 66 has a dryer 72 connected to it.

The liquid heat transfer medium in the first liquid conduit means 64 is now conducted through a first expansion valve 74 and expanded into the inlet port 76 of evaporator 32. As the heat transfer fluid is evaporated in evaporator 32, blower 34 circulates air past the evaporator coils for cooling the front passenger area. The gaseous heat transfer medium is now discharged through outlet port 78 into first suction conduit means 52 to be returned to compressor 24 to be recycled.

The liquid heat transfer medium in the second liquid conduit means 66 is conducted through a second expansion valve 80 and expanded into inlet port 82 of evaporator 36. As the heat transfer fluid is evaporated in evaporator 36, blower 38 circulates air past the evaporator coils for cooling the rear living area. The gaseous heat transfer medium is now discharged through outlet port 84 into the second suction conduit means 54 to be returned to compressor 24 via the third suction conduit means 56. It should be mentioned that first and second expansion valves 74 and 80 can also be capillary tubes or the like for use in expanding the heat transfer fluid prior to entry into evaporators 32 and 36.

When the electric motor driven compressor 42 driven by electric motor 86 having an electrical outlet 20 is used rather than the engine drive compressor 24, the gaseous heat transfer medium is received through suction port 88 from the first suction conduit means 52 via the third suction conduit means 56 and the second suction conduit means 54. The suction conduit means prior to entering the suction port 88 also includes a low pressure cut out switch 90 (i.e., pressure less than 30 psi) which is responsive to the pressure of the heat transfer medium and is electrically connected to the electric motor 86 which is shut off at low pressures thus rendering the compressor 42 inoperable.

From compressor 42 the compressed gaseous heat transfer medium is discharged through outlet port 89 to a second discharge conduit means 92. The heat transfer medium is received through the inlet ports 25 and 27 of the condensers 26 and 28. The heat transfer medium is condensed and discharged to the first and second liquid conduit means 64 and 66.

The same circulation cycle as described above using the vehicle motor driven compressor 24 is now used with the heat transfer medium entering the first and second expansion valves 74 and 80 and then into evaporators 32 and 36. The gaseous heat transfer fluid is then discharged through outlet ports 78 and 84 and into first suction conduit means 52 and third suction conduit means 56 and second suction conduit means 54 for return to the suction port 88 of the compressor 42.

FIG. 4 is an electrical wiring diagram of the air conditioning assembly 10. Toggle switch 14 being connected to the 12 volt dc battery source 16 which is installed in the vehicle 12 and a 12 volt ac source from a transformer 100 which is connected to the electrical outlet 20. The outlet 20 can be connected to an outside source of 110 ac line voltage or the alternate gas drive generator 22.

When the toggle switch 14 is connected to either the 12 volt ac or 12 volt dc source, current is supplied to drive the air circulating blowers 30 mounted with the condensers 26 and 28. Current is supplied also to the blower switch 102 connected to blower motor 104 which drives the blowers 34 vented to evaporator 32. Thermostat 106 is connected to the blower switch 102 to control the predetermined temperature of the front passenger area.

High pressure cut out switch 62 is also connected to the electric circuit and signals the clutch 64 to disengage the automotive compressor 24 from the vehicle engine 18 should the heat transfer medium's pressure exceed 400 psi in the air conditioning assembly 10.

Also electrically controlled from the 12 volt toggle switch 14 is blower switch 108 and thermostat 110 which turns on and off blower motor 112 driving blowers 38 vented to evaporator 36. Connected to this electrical circuit is low pressure cut out switch 90 which through relay 114 turns electrical motor 86 driving the compressor 42 off should the heat transfer medium pressure drop below 30 psi in the air conditioning assembly 10.

Electric motor 86 driving compressor 42 is connected through relay 114 directly to the electrical outlet 20 for obtaining 110 a-c line voltage from an outside source or the alternate gas driven generator 22. Shown connected to the outlet 20 is voltage indicator 21 which would warn against using the a-c line source should the voltage drop below 110 volts.

Changes may be made in the construction and arrangement of parts or elements of the various embodiments as disclosed herein without departing from the spirit and scope of the invention as defined in the following claims.

What is claimed is:

1. A refrigeration type air conditioning assembly employing a heat transfer medium for use in a motor home vehicle or the like having a front passenger area and a rear living area, and which is equipped with an engine, a source of d-c voltage, and an electrical outlet for connecting the motor vehicle or the like to a source of a-c line voltage, comprising:

a first compressor means, having a suction port and a discharge port, for compressing the gaseous heat transfer medium passing therethrough;

means for drivingly connecting said first compressor to the engine of the vehicle;

a second compressor means having a suction port and a discharge port, for compressing the gaseous heat transfer medium passing therethrough;

an electric drive motor drivingly connected to said second compressor and mounted on the vehicle;

electrical conductor means connected to said electric drive motor for electrically connecting said electric drive motor to the electrical outlet of the motor vehicle to provide a-c line voltage to said electric drive motor;

a first condenser coil means, having an inlet port and an outlet port and mounted on the motor vehicle, for condensing the gaseous heat transfer medium passing therethrough into the liquid state;

a second condenser coil means, having an inlet port and an outlet port and mounted on the motor vehicle, for condensing the gaseous heat transfer medium passing therethrough into the liquid state;

a first evaporator coil means, having an inlet port and an outlet port and mounted on the motor vehicle proximate to the front passenger area, for evaporating the liquid heat transfer medium passing therethrough into the gaseous state;

a second evaporator coil means, having an inlet port and an outlet port and mounted on the motor vehicle proximate to the rear living area, for evaporating the liquid heat transfer medium passing therethrough into the gaseous state;

first discharge conduit means interconnecting the discharge port of said first compressor means and the inlet ports of said first and second condensor coil means, for conducting gaseous heat transfer medium from said first compressor means to said first and second condensor coil means;

second discharge conduit means interconnecting the discharge port of said second compressor means and the inlet ports of said first and second condensor coil means for conducting gaseous heat transfer medium from said second compressor means to said first and second condensor coil means;

first liquid conduit means interconnecting the outlet port of said first condensor coil means and the inlet port of said first evaporator coil means for conducting liquid heat transfer medium from said first condensor coil means to said first evaporator coil means;

second liquid conduit means interconnecting the outlet port of said second condensor coil means and the inlet port of said second evaporator coil means for conducting liquid heat transfer medium from said second condensor coil means to said second evaporator coil means;

first suction conduit means interconnecting the outlet port of said first evaporator coil means and the suction port of said first compressor means for conducting gaseous heat transfer medium from said first evaporator coil means to said first compressor means;

second suction conduit means interconnecting the outlet port of said second evaporator coil means and the suction port of said second compressor means for conducting gaseous heat transfer medium from said second evaporator coil means to said second compressor means;

third suction conduit means interconnecting the outlet ports of said first and second evaporator coil means;

first blower means disposed adjacent to said first evaporator coil means for moving air over said first evaporator coil means and into the front passenger area; and second blower means disposed adjacent to said first evaporator coil means for moving air over said second evaporator coil means and into the rear living area;

air circulating means mounted on the vehicle for moving air over said first and second condensor coil means;

a first expansion valve means connected to said first liquid conduit means and disposed adjacent to the inlet port of said first evaporator coil means; and a second expansion valve means connected to said second liquid conduit means and disposed adjacent to the inlet port of said second evaporator coil means.

2. The air conditioning assembly as defined in claim 1 characterized further to include:

means disposed in said first discharge conduit means and responsive to the pressure of the heat transfer medium therein for disconnecting said first compressor means from the engine when the heat transfer medium pressure therein exceeds a predetermined value, whereby said first compressor means is rendered inoperative; and means disposed in said second suction conduit means and responsive to the pressure of the heat transfer medium therein for disconnecting said second compressor means from said electric drive motor when the heat transfer medium pressure therein is less than a predetermined value, whereby said second compressor means is rendered inoperative.

3. The air conditioning assembly as defined in claim 1 further characterized to include electrical switch means connected to the d-c voltage source and to the a-c line voltage source so that the voltage source to the means for drivingly connecting said first compressor means to the engine can be switched to the electric drive motor drivingly connected to said second compressor means thereby switching the assembly from said first compressor means to said second compressor means.

4. The air conditioning system as defined in claim 1 wherein said first and second liquid conduit means are further characterized to include a dryer for absorbing moisture from the heat transfer medium.

5. The air conditioning system as defined in claim 1 wherein said first liquid conduit means is further characterized to include a sight glass for determining whether there is air entrainment in the assembly.

6. The air conditioning system as defined in claim 1 wherein the conduit means are made of copper tubing and nylon hose for use with any type of refrigerant and more specifically Freon 22 as a heat transfer medium for maximum cooling efficiency.

7. The air conditioning system as defined in claim 1 wherein said first condenser coil means and said second condenser coil means are mounted on the motor vehicle proximate to the rear living area.

8. The air conditioning system as defined in claim 7 wherein said first condenser coil means, said second condenser coil means, said second compressor means, said electric drive motor, and said air circulating means are mounted together as a unit proximate to the rear living area.

9. The air conditioning system as defined in claim 8 wherein second compressor means is mounted in a recess in the roof of the vehicle so that a minimum clearance as to the overall height of the vehicle is maintained.

10. A method for air conditioning a motor home vehicle or the like employing a heat transfer medium and cooling a front passenger area and a rear living area using a first compressor driven by the vehicle's engine and a second compressor driven by an electric drive motor, a first condenser coil and second condenser coil mounted on the roof of the vehicle, a first evaporator coil and second evaporator coil, a first expansion valve and a second expansion valve mounted on the first evaporator coil and second evaporator coil, respectively, the first evaporator coil and a first blower being mounted under the dash of the vehicle, the second evaporator coil and a second blower being mounted on the roof of the vehicle, comprising the steps of:

compressing gaseous heat transfer medium with the first compressor in a driven condition of the first compressor;

compressing the gaseous heat transfer medium with the second compressor in a driven condition of the second compressor;

driving one of the first and the second compressors via driving the first compressor via the vehicle engine in one condition and driving the second compressor via an electric motor drive in one other condition;

conducting the compressed gaseous heat transfer medium to the first and second condensor coils;

condensing the compressed gaseous heat transfer medium to a liquid heat transfer medium in the condensor coils;

conducting the condensed liquid heat transfer medium to the first and second evaporator coils;

expanding the liquid heat transfer medium through the first and second expansion valves prior to the liquid heat transfer medium entering the first and second evaporator;

evaporating the liquid heat transfer medium to a gaseous heat transfer medium by circulation through the evaporator coils;

circulating air using the first and second blowers past the evaporator coils to cool the passenger area and the rear living area; and returning the gaseous heat transfer medium from the evaporator coils to the compressor.

11. The method as defined in claim 10 further characterized, after the step of condensing the compressed gaseous heat transfer medium to a liquid heat transfer medium in the condenser coils, to include the step of: passing air over the first and second condenser coils to aid the condenser coils in condensing the compressed gaseous heat transfer medium.

* * * * *